United States Patent
Kristensen et al.

(10) Patent No.: US 6,747,798 B2
(45) Date of Patent: Jun. 8, 2004

(54) POLARIZATION CONTROL OF UV WRITING

(75) Inventors: Martin Kristensen, Lyngby (DK); Jörg Hübner, Ålsgårde (DK)

(73) Assignee: ADC Telecommunications, Inc., Eden Prairie, MN (US)

(*) Notice: Subject to any disclaimer, the term of this patent is extended or adjusted under 35 U.S.C. 154(b) by 259 days.

(21) Appl. No.: 09/861,907

(22) Filed: May 21, 2001

(65) Prior Publication Data

US 2002/0015919 A1 Feb. 7, 2002

Related U.S. Application Data

(60) Provisional application No. 60/205,577, filed on May 22, 2000.

(51) Int. Cl.[7] .............................. G02B 27/44; G02B 5/18
(52) U.S. Cl. .................................... 359/566; 385/37
(58) Field of Search ............................. 359/566, 569, 359/572; 385/37

(56) References Cited

U.S. PATENT DOCUMENTS

| | | | |
|---|---|---|---|
| 4,565,426 A | 1/1986 | Cullen | 359/495 |
| 5,161,039 A | 11/1992 | Schellenberg | 359/3 |
| 5,218,651 A | 6/1993 | Faco et al. | 385/4 |
| 5,550,654 A | 8/1996 | Erdogan et al. | 359/3 |
| 5,830,622 A | 11/1998 | Canning et al. | 430/321 |
| 5,881,187 A | 3/1999 | Modavis | 385/37 |
| 5,912,999 A | * 6/1999 | Brennan et al. | 385/37 |

FOREIGN PATENT DOCUMENTS

| | | |
|---|---|---|
| GB | 2275347 | 8/1994 |
| WO | 86/01303 | 2/1986 |
| WO | WO 97/21120 | 12/1997 |

* cited by examiner

*Primary Examiner*—Mark A. Robinson
*Assistant Examiner*—Alessandro Amari
(74) *Attorney, Agent, or Firm*—Carlson, Caspers, Vandenburgh & Lindquist

(57) ABSTRACT

A system and method are provided for writing refractive index structures, such as gratings, in an optical waveguide. There is no requirement for structures having interferometric stability of the control elements. The method includes providing first and second light beams, the first beam having a first polarization state and a first wavevector, the second beam having a second polarization state different from the first polarization state, and a second wavevector different from the first wavevector. The method also includes illuminating a diffractive optical element by at least a part of the first beam and a part of the second beam so as to diffract parts of the first and second beams, and positioning the medium in relation to the diffractive element so as to illuminate the first part of the medium by the diffracted parts of the first and second beams.

43 Claims, 12 Drawing Sheets

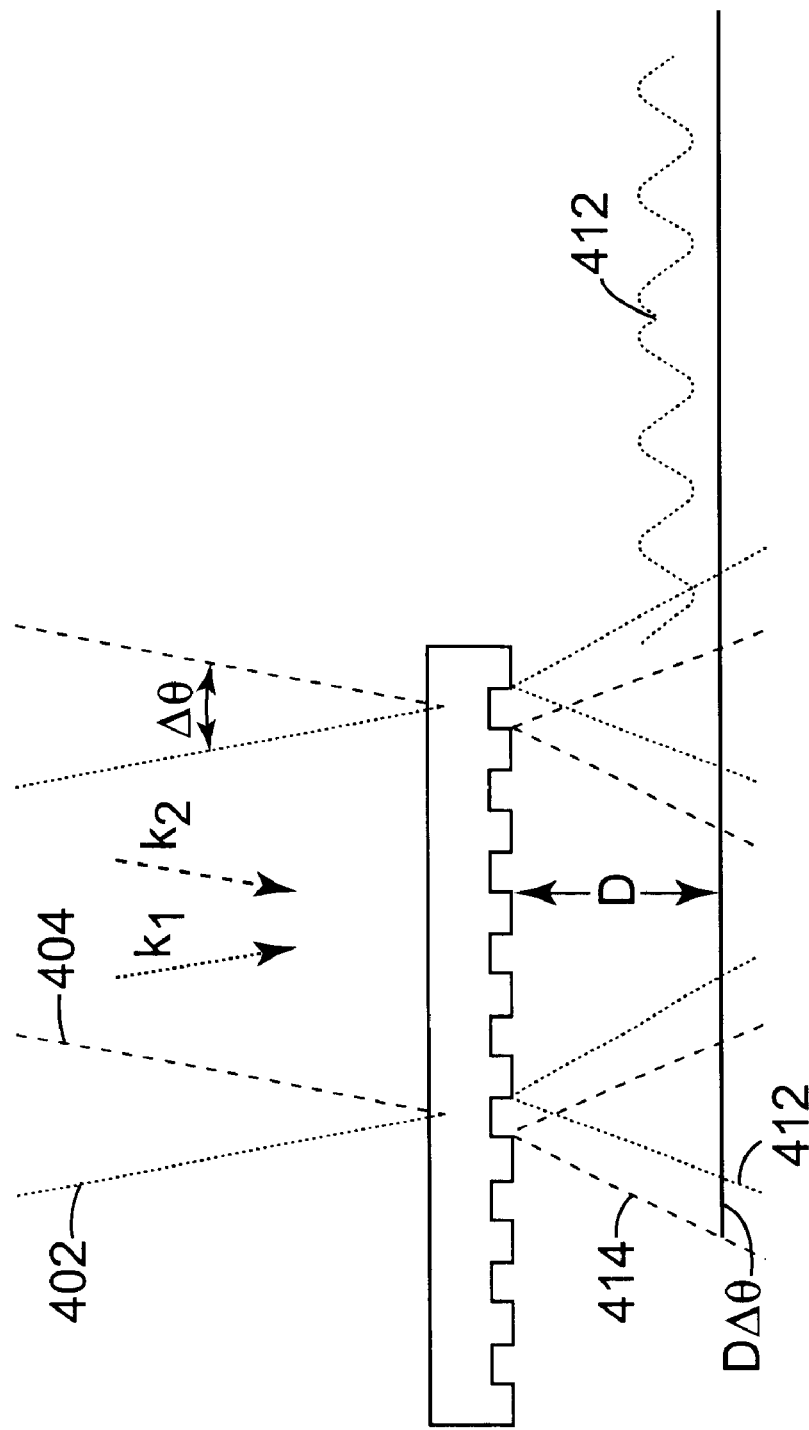

POLARIZATION CONTROL OF UV WRITING

RELATED APPLICATIONS

This application claims priority from U.S. provisional patent application No. 60/205,577, filed May 22, 2000, which is incorporated herein by reference.

FIELD OF THE INVENTION

The present invention is directed generally to a method and apparatus for forming refractive index gratings in a medium, and more particularly to a method and apparatus that uses polarization control of the exposing beams for forming refractive index gratings in the medium.

BACKGROUND

Certain optical media, including at least some silica-based waveguides, can be modified by exposure to electromagnetic radiation in an appropriate spectral range. The exposure of the optical media may induce refractive index changes affecting the optical properties in the illuminated portions of the optical medium.

Refractive index changes can be induced in photosensitive optical media. The photosensitivity means that the incident electromagnetic radiation interacts, at least to some degree, with the matter constituting the medium, implying an absorption of the electromagnetic radiation in the medium. Hence, the photosensitivity of the optical medium, and the strength of the changes in the refractive index, are dependent of the chemical composition of the medium. Germanosilicates are widely used for photosensitive waveguides, but other materials and/or other dopants than germanium may also give the desired photosensitivity.

Ideally, the photo-induced change in the refractive index, $\Delta n$, is linearly dependent upon the fluence of radiation on the photosensitive medium. The fluence, $\phi(r)$, is the amount of energy per unit area and is defined as $\phi(r) = \int I(t)\,dt$, where $I(t)$ is the intensity of the applied radiation at time t, for a position r. Hence both the fluence and the intensity are used for characterizing the radiation. The dependency of $\Delta n$ on $\phi(r)$ diverges from the ideal linear dependency for some material compositions and/or for high intensities.

If the incident radiation field forms a pattern on the medium, the induced changes in the refractive index may form a corresponding pattern. For example, an interference pattern in the incident radiation field may form a periodic pattern in the photosensitive medium, such as a periodic pattern forming one or more Bragg gratings. FIG. 1A illustrates a typical method for writing a periodic index pattern in a waveguide such as an optical fiber or a planar waveguide. A laser beam 102 of actinic radiation is directed through a phase mask 104, through a cladding layer 108 of the medium 106 and into the core 110. The phase mask 104 generates an interference pattern with a period half that of its surface relief pattern 105. Index of refraction changes in the core 110 occur predominantly at the bright fringes of the interference pattern, thus creating a periodic variation 112 in the refractive index grating, also referred to as a grating, in the core 110. The laser beam 102 may be translated along the medium 106 in order to write a longer grating 112, for a given width of beam 102. The actinic radiation used is typically UV or near UV radiation, but other wavelength ranges may be used, depending on the wavelength sensitivity of the photosensitive species in the core 110.

The refractive index grating 112 may operate as a spectrally selective reflector or transmitter for electromagnetic radiation propagating along the core 110. In general, the spectral response of the refractive index grating 110 is determined by a number of different parameters, including the shape of the grating, the period of the refractive index modulation, the variation in the period (also referred to as chirp), phase relations, amplitude modulations and the like.

In a simple approach, the shape and size of the grating 112, may be described as the effective refractive index, $n(r)$, as a function of position. In a simple form, the effective refractive index may be given as $n(r) = n_0 + \Delta n(r)$, where $n_0$ is independent of position. This expression may not, however, be adequate in all contexts since the refractive index of a medium may also depend on the frequency and the polarization of the light propagating in the medium, as well as number of other parameters.

Various methods for controlling the writing of the refractive index grating have been proposed and utilized in the prior art. These methods have been based on such parameters as control of the laser intensity, scan speed, pulse rate, or using a controlled vibration of the phase mask or sample, or some combination of these.

A frequently used technique to improve the spectral response when writing refractive index gratings in waveguide structures is apodisation. A frequently encountered problem during apodisation is chirp. The period $\Lambda$ of a periodic grating is the optical distance between amplitude peaks in the periodic structure. However, the optical distance between two points is also dependent on the mean refractive index in the region between the two points. Hence, when the refractive index modulation is written, the mean index and thereby the optical distance and the period may change throughout the grating structure. Since the amplitude of the grating modulation typically varies over the periodic structure, for example to obtain apodization, the mean index and hence the period seen by radiation propagating in the medium varies, and the grating is subject to "chirp". This is illustrated in FIG. 1B wherein the oscillating curve 152 shows the periodic structure and the solid curve 154 represents the mean index change along the grating.

U.S. Pat. No. 5,830,622 discloses a method for modulating the mean index by providing a method for forming an optical grating using two steps. In the first step, the periodic grating structure is written in a glass. Subsequent or prior thereto, a region concomitant to the grating structure is illuminated with radiation having a predetermined spatial distribution, intensity, wavelength etc. in order to raise and/or modulate the mean refractive index of the region. A disadvantage of the method for controlling the writing of refractive index gratings disclosed in U.S. Pat. No. 5,830,622 is that two separate exposures are required.

WO 97/21120 discloses a method for writing a refractive index grating by creating an interference pattern in the medium between two beams. The two beams are formed from one beam by deflecting parts of the beam to generate two beams, which are controlled simultaneously by overlapping the beam paths of the two beams.

It is a disadvantage of the existing methods for controlling the writing of refractive index gratings that the material is non-reciprocal meaning that the photosensitivity is changed during the first exposure and the change in photosensitivity is a non-linear function of the locally applied fluence. Therefore it is nearly impossible to raise the mean refractive index to a constant level and/or maintain the desired refractive index amplitude simultaneously.

It is a disadvantage of the other existing vibration-based methods for controlling the writing of refractive index gratings that interferometric (submicron) stability is needed for the entire writing set-up.

SUMMARY OF THE INVENTION

The present invention is directed to a system and method for controlling the writing of refractive index structures such as gratings in an optical waveguide, and in particular to a system and method that may use only a single writing step. The present invention is further directed to a system and method for controlling the writing of refractive index structures that do not require interferometric stability of the control elements.

One embodiment of the invention is directed to a method for changing a refractive index of a first part of a medium. The method includes simultaneously illuminating the first part of the medium with at least part of a first beam of electromagnetic radiation and at least part of a second beam of electromagnetic radiation, wherein the first beam has a first polarization state and a first wavevector and the second beam has a second polarization state different from the first polarization state, and a second wavevector different from the first wavevector.

Another embodiment of the invention is directed to a method for changing a refractive index of a first part of a medium, that includes providing first and second beams of electromagnetic radiation, the first beam having a first polarization state and a first wavevector, the second beam having a second polarization state different from the first polarization state, and a second wavevector different from the first wavevector. The method also includes illuminating a diffractive optical element by at least a part of the first beam and a part of the second beam so as to diffract parts of the first and second beams, and positioning the medium in relation to the diffractive element so as to illuminate the first part of the medium by the diffracted parts of the first and second beams.

Another embodiment of the invention is directed to a method for inducing a refractive index grating in a medium that includes generating a substantially polarized light beam, dividing the first beam into a second beam and a third beam using a polarizing beamsplitter, the second and third beams being mutually orthogonally polarized and having respective second and third wavevectors, the second wavevector being different form the third wavevector. The method also includes substantially extinguishing the third beam, generating a second diffraction pattern by illuminating a diffractive optical element with the second beam and illuminating a first part of the medium with the first diffraction pattern so as to induce a first refractive index grating in the medium, the first refractive index grating having a first period $\theta_1$. The method also includes substantially extinguishing the second beam, generating a third diffraction pattern by illuminating a diffractive optical element with the third beam, and illuminating a second part of the medium with the third diffraction pattern so as to induce a second refractive index grating in the medium, the second refractive index grating having a second period $\Lambda_2$. The method also includes controlling a phase between the first refractive index grating and the second refractive index grating by controlling a distance between the diffractive optical element and the medium.

Another embodiment of the invention is directed to a method of changing the refractive index of a medium that includes illuminating a first part of the medium with a first set of diffracted light beams produced by a diffractive optical element so as to induce a first refractive index grating in the medium, and illuminating a second part of the medium with a second set of diffracted light beams produced by the diffractive optical element so as to induce a second refractive index grating in a second part of the medium. The method also includes controlling a phase difference between the first and second refractive index gratings by adjusting a working distance between the medium and the diffracting optical element.

Another embodiment of the invention is directed to a system for changing a refractive index of at least part of a medium. The system includes means for generating first and second beams of electromagnetic radiation having first and second wavevectors respectively, the first beam being polarized substantially orthogonally to the second beam, and diffracting means for generating a first set of diffracted beams with a first polarization state when illuminated by the first beam and for generating a second set of diffracted beams with a second polarization state when illuminated by the second beam. At least the part of the medium is positioned so as to be illuminated by at least part of one of the first and second sets of diffracted beams.

Another embodiment of the invention is directed to a system for changing refractive index of at least part of a medium that includes a light generating unit producing a first polarized light beam having a first wavevector and a second polarized light beam having a second wavevector different form the first wavevector, the first beam being polarized substantially orthogonally to the second beam. The system also includes a diffractive optical element disposed in the first and second beams to generate a first set of diffracted beams from the first beam and a second set of diffracted beams from the second beam, the at least the part of the medium being positioned so as to be illuminated by at least part of one of the first and second sets of diffracted beams.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 4A–4C schematically illustrate cross-sectional views of a system for writing gratings according to an embodiment of the present invention and also illustrate gratings written using a phase mask and two light beams having mutually perpendicular polarization according to the embodiments of the present invention;

Figure 1A:
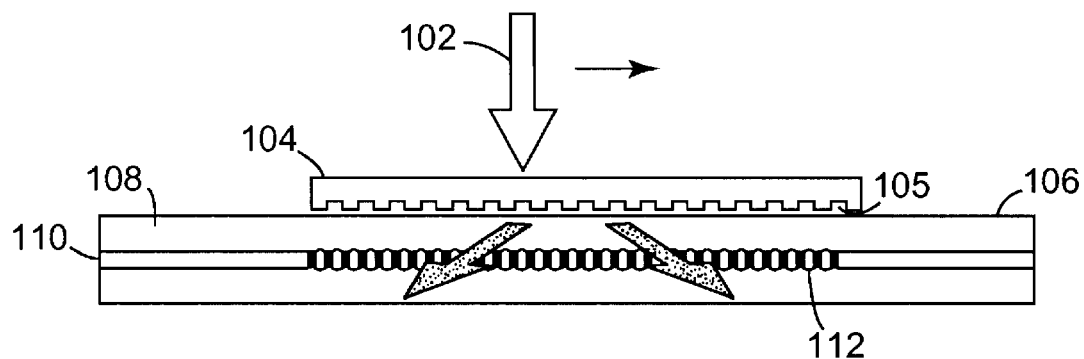
FIG. 1A is a schematic drawing showing the formation of a grating according to the prior art using a laser and a phase mask.
Figure 1B:
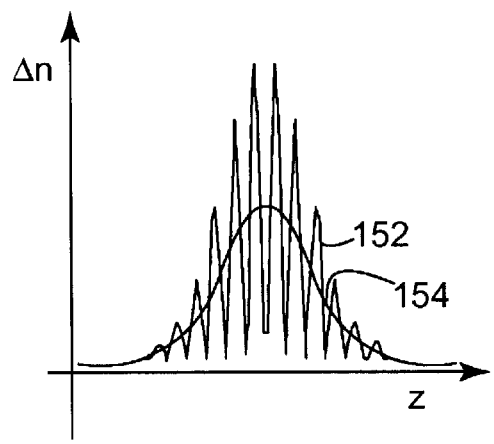
FIG. 1B the profile of a refractive index grating resulting from the arrangement illustrated in FIG. 1A.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to methods for forming refracting index gratings in optical media, and is believed to be particularly suited to forming Bragg gratings in waveguides.

Throughout the present application, geometrical quantities written in bold type, such as k, designate vector quantities. Also, references are often made to the polarization of a beam of electromagnetic radiation as being either "perpendicular" or "parallel" to another direction. However, in practice there are typically small deviations in the polarization from perfect alignment, for example partially stochastic polarizations, partially elliptical polarizations or small angular deviations. It is the intent that the terms "perpendicular" and "parallel" cover small deviations from the perfect cases, and so it should be understood that "perpendicular" means "at least substantially perpendicular" and "parallel" means "at least substantially parallel". Also, the frequency of a light beam is typically a frequency range characterized by a distribution having a given width, typically referred to as bandwidth, and a center frequency referred to as the frequency of the beam.

An index modulation formed by a diffraction pattern of actinic radiation is preferably represented by the first order refractive index $$n(r) = n_{medium} + g_{env}(r) \cdot \Delta n(r) \quad (1)$$

where r is a position vector, $n_{medium}$ is the refractive index for the medium without index modulations, and $g_{env}(r) \cdot \Delta n(r)$ is the change in refractive index defining the total index modulation. The term $\Delta n(r)$ represents the shape of the index modulation, typically corresponding to the diffraction pattern of a phase mask. The amplitude envelope function $g_{env}(r)$ describes the variation of the modulation amplitude along the extent of the index modulation. The amplitude envelope function $g_{env}(r)$ may depend on several factors, including but not limited to: the beam profile of the incoming light, adjustment of the light intensity during displacement of the light in relation to the medium, an amplitude mask, a special phase mask, and the like. Typically, the diffraction pattern is periodic and the induced modulation is a periodic modulation such as a refractive index grating e.g. a Bragg grating.

Alternatively, expression (1) may be restated as:

$$n(r) = n_{medium} + n_{mean}(r) + n_{mod}(r), \quad (2)$$

where $n_{mean}(r)$ represents the induced mean effective index change and $n_{mod}(r)$ represents the shape of the index modulation of the grating on top of $n_{mean}(r)$.

Hence, the changes corresponding to the intensity distribution of the first and/or the second diffraction pattern may induce a first and a second periodic refractive index grating in the medium corresponding to the first and the second diffraction pattern, the first refractive index grating having a first period $\Lambda_1$ and a first amplitude envelope function $g_{env, 1}$ and the second refractive index grating having a second period $\Lambda_2$ and a second amplitude envelope function $g_{env, 2}$. Preferably, the first and the second periods are at least substantially identical, thus $\Lambda_1 = \Lambda_2$.

The phase relation between the first and the second refractive index gratings may be adjusted by adjusting the displacement of the diffracted parts of the first and second beams at the first part of the medium. This displacement can be adjusted by adjusting the distance between the medium and the diffractive optical element. In addition, the phase relation between the first and the second refractive index gratings may be adjusted by adjusting an angle of incidence of the first and/or the second beam upon the diffractive optical element.

By adjusting the first amplitude envelope function $g_{env, 1}$ in relation to the second amplitude envelope function $g_{env, 2}$ and adjusting the phase relation between the first and the second refractive index grating, a substantially constant mean refractive index can be induced over the extent of the first grating in the medium. As will be described in detail later, the modulations resulting from the first and second diffraction patterns may cancel out partly or totally, resulting in reduced or no index modulation but an increased underlying mean refractive index.

The radiation used for exposing the medium are preferably within the range of deep UV to near UV, 150 nm to 450 nm, and is typically generated by UV laser sources such as helium cadmium lasers, frequency doubled argon-ion lasers, solid state lasers having nonlinear frequency conversion such as frequency tripled or quadrupled Nd:YAG lasers, or rare-gas halide lasers such as KrF lasers or ArF lasers. There is no intention to limit the type of source that might be used in the present invention. The term "beam" is used throughout the present application without the intention of restricting the used source of actinic radiation.

The beams are preferably UV laser beams, and the set-up for providing and controlling the beams typically includes optical control elements such as lenses, telescopes, prisms, gratings and other diffracting elements, pinholes, attenuation filters, elements for controlling the polarization such as optical active materials, half wave plates, quarter wave plates, polarizers, etc., and some beam deflecting optics such as prisms, gratings, beamsplitters, mirrors etc.

By utilizing two perpendicular polarized beams of light, it is possible to induce refractive index changes in the same part of a medium using both beams, without any (first order) interference between the beams. By applying a patterned radiation field for both fields, two different, overlapping patterns can be written simultaneously in the medium, still without any (first order) interference between the beams.

Figure 2:
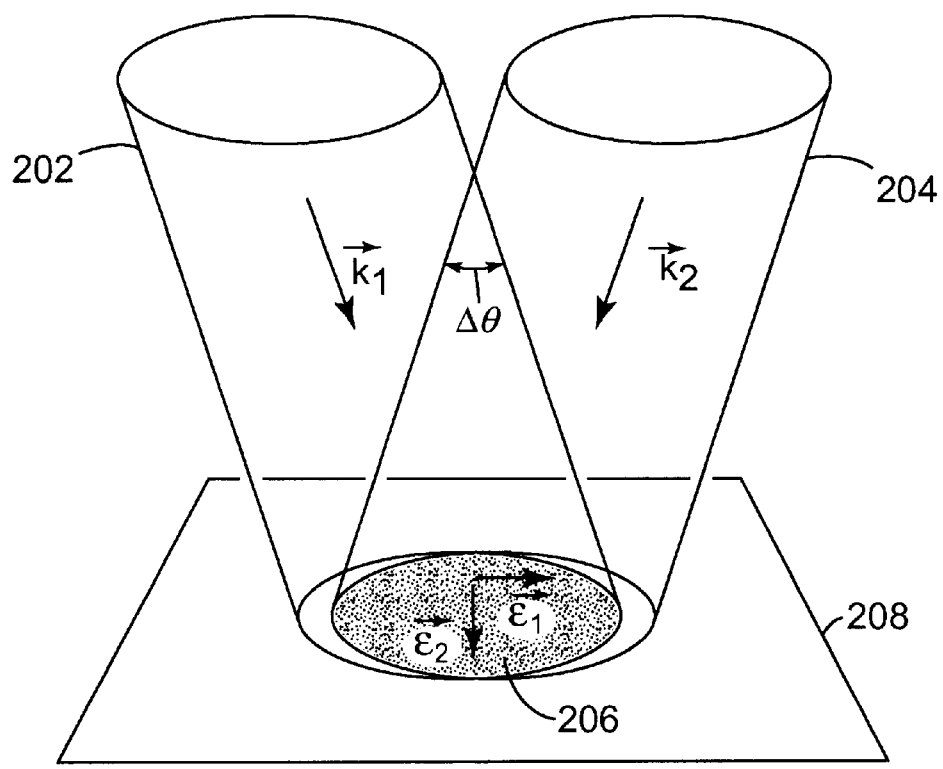
FIG. 2 schematically illustrates two beams of perpendicularly polarized radiation incident on the same area of a medium from different directions.

In an embodiment shown in FIG. 2, first and second beams 202 and 204, characterized by wavevectors $k_1$ and $k_2$ and having polarization states characterized by orthogonal polarization vectors $\epsilon_1$ and $\epsilon_2$, illuminate a photosensitive medium 208. In the illustrated embodiment, the beams 202 and 204 are non-parallel, making an angle $\Delta\theta$ to each other. In another embodiment, not illustrated, the beams may be parallel but have different frequencies. The polarization states are typically, but not necessarily, linear polarization states. If the polarization states are elliptical polarization states, the polarization vectors $\epsilon_1(t)$ and $\Delta_2(t)$ are preferably perpendicular to each other on the Poincaré sphere.

The two beams 202 and 204 overlap in the area 206 on the medium 208. Since the beams 202 and 204 are polarized mutually perpendicularly, there is no interference between the beams 202 and 204 in the overlap area 206. Thus, in the overlap area, the total fluence of incident radiation is the sum of the fluence of each of the two beams 202 and 204, and the refractive index is changed according to the total fluence. The photosensitivity of the medium 208 may be polarization dependent, whereby the two beams 202 and 204 contribute different changes in the refractive index, even though the beams 202 and 204 may have equal fluences.

Figure 3:
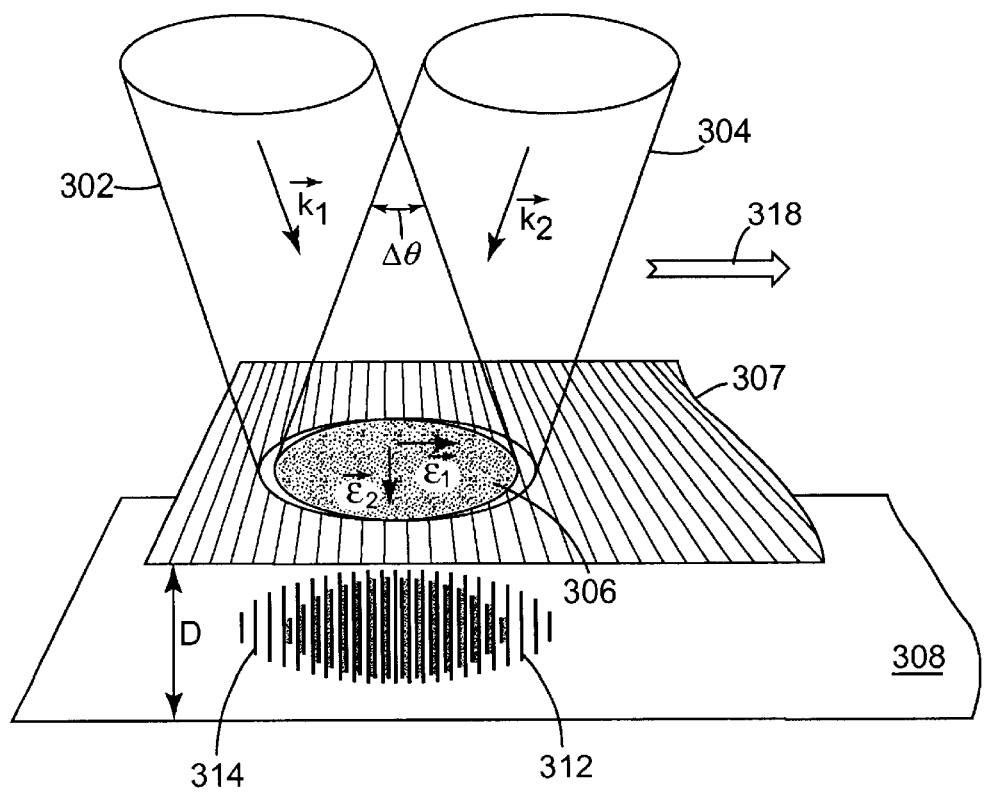
FIG. 3 schematically illustrates two beams of perpendicularly polarized radiation incident on the same area of a phase mask from different directions thereby generating two overlapping diffraction patterns in the medium, according to an embodiment of the present invention.

In another embodiment, illustrated in FIG. 3, two beams 302 and 304 illuminate a phase mask 307 to produce respective diffraction patterns 312 and 314. The diffraction patterns 312 and 314 are incident on the medium 308 positioned at a distance D from the phase mask 307. Each diffraction pattern 312 and 314 induces refractive index changes in the medium 308 according to its respective fluence distribution. If the phase mask 307 is polarization preserving, there are no first order interference effects between the two diffraction patterns 312 and 314. The resulting refractive index grating written into the medium 308 corresponds to the linear superposition of the two diffraction patterns 312 and 314.

In order to write a refractive grating over a larger section of the medium 308, the beams 302 and 304 are typically scanned in relation to the medium 308 in a direction, for example as indicated by the arrow 318.

Figure 4A:
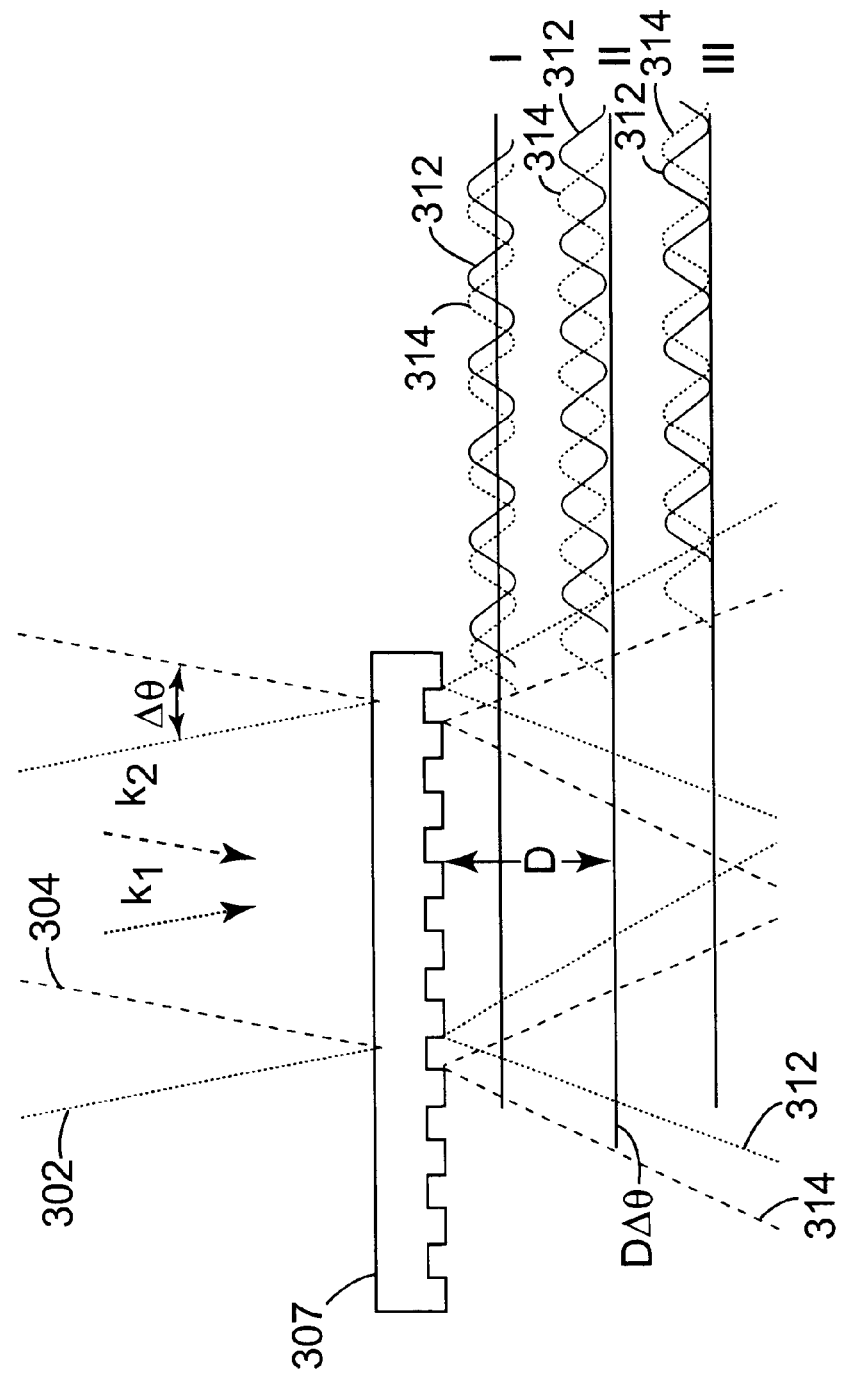
Figure 4B:
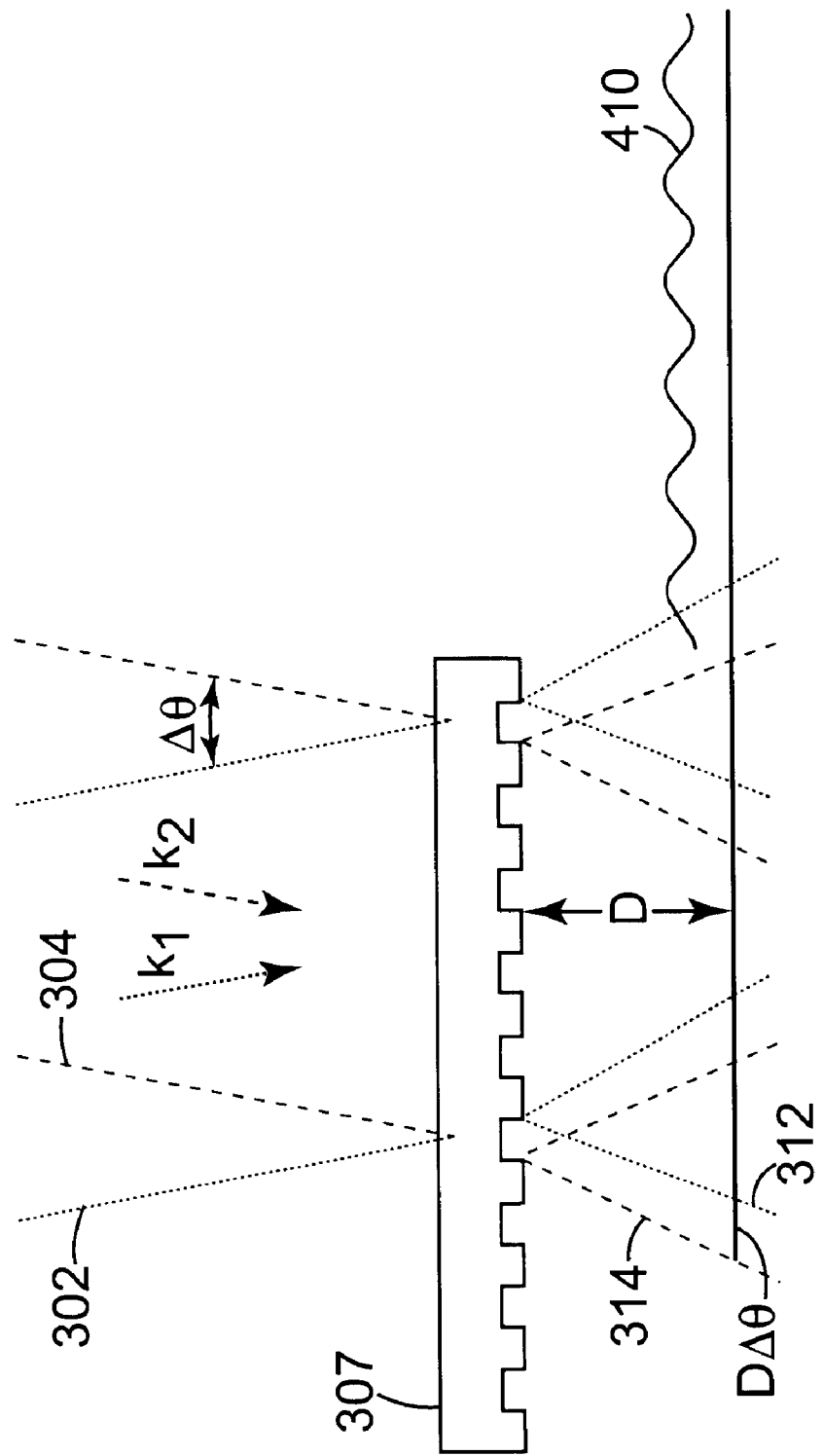

Some general principles and examples of resulting gratings are described in relation to FIGS. 4A–4C, which show cross-sectional views of the arrangement described in FIG. 3. The dotted and dashed lines illustrate the first and second beams 302 and 304 respectively and their respective diffraction patterns 312 and 314. The first and second diffraction patterns 312 and 314 propagate in directions making an angle $\Delta\theta$ equal to the angle between the first and the second beams 302 and 304. The angle may be corrected using Snell's law due to the different refractive indices along the direction of propagation. Thus, the first and the second diffraction patterns 312 and 314 are phase shifted in relation to each other as a function of the distance D from the phase mask. FIGS. 4A–4C show first order sinusoidal diffraction patterns in the medium 308 for different situations. The curves to the right of the figures represent the fluence as a function of position for the two diffraction patterns 312 and 314.

The resulting gratings are (ideally) proportional to the superposition of the two gratings, hence $$\Delta n(r) \propto A_1 \sin^2(ar) + A_2 \sin^2(ar \pm a \cdot D \cdot \Delta\theta) \qquad (3)$$

where r denotes distance in the medium 308 along the direction of the grating, a is a constant=$2\pi/\Lambda$, $\Lambda$ being the period of the diffraction pattern, and where $A_1$ and $A_2$ are the total fluences in the first and second diffraction patterns 312 and 314 respectively. The total index modulation can be expressed more generally according to expression (1)

$$g_{env}(r) \cdot \Delta n(r) \propto F_1(r) + F_2(r, D \cdot \Delta\theta), \qquad (4)$$

where $F_i$ (i=1, 2) is a function describing the total diffraction pattern 312 and 314 from each respective beam 302 and 304. It should be noted that the shape of $F_i$ primarily depends on the phase mask whereas the amplitude of $F_i$ primarily depends on the fluence, and the beam profiles, of each beam individually, all of which may vary along with the scanning. Hence $F_i$ also represents the amplitude envelope functions $g_{env,\,i}$ for each of the two diffraction patterns 312 and 314 respectively.

As can be seen from expression (4), it becomes possible to form complicated grating structures by adjusting D, $\Delta\theta$, $F_1$ and $F_2$. By properly choosing D·$\Delta\theta$, for example, it is possible to displace, that is phase shift, the two diffraction patterns by a desired amount, as illustrated by the three cases I, II, and III in FIG. 4A: the relative phase between the two patterns 312 and 314 is dependent on the distance D. Cases I, II and III show the changing phase difference between the two patterns 312 and 314 as D is increased.

If the distance D is adjusted so that diffraction patterns 312 and 314 have a relative phase shift of half a period, for example as illustrated for case II, and if the fluences of the first and the second beam are the same, the superposition becomes $\Delta n(r) \propto A_1 \sin^2(ar) + A_1 \cos^2(ar) = A_1$. Thus no grating is written in the situation illustrated in Case II. The refractive index is shifted, however, to a mean value $n_{mean}$ equal to the mean values over the gratings of cases I and III.

The resulting gratings in cases I and III are periodic with a period $\Lambda$. However, the modulation of the refractive index in cases I and III is, in general, not sinusoidal since the modulation is a superposition of two sinusoidal modulations having a relative phase shift of $2\pi \cdot (D \cdot \Delta\theta)/\Lambda$.

If the relative fluences in the two beams 302 and 304 in Case II is adjusted so as to conserve the total fluence, for example, by adjusting the exposure parameters such as pulse duration, repetition rates, intensities, illumination times and the like, it may then be possible to control the grating strength according to the formula $\Delta n(r) \propto A_1 \sin^2(ar) + A_2 \cos^2(ar) = (A_1 - A_2) \sin^2(ar) + A_2$. In this case, shown in FIG. 4B, the index modulation is elevated according to $A_2$, producing a, d, c, background level. The medium will still have the same mean index $n_{mean}$ as in the cases I, II, and III of FIG. 4A. Furthermore, a grating 410 is written in the material 308 with modulation $\Delta n(r) \propto (A_1 - A_2) \sin^2(ar)$, the magnitude of the modulation depending on the difference between $A_1$ and $A_2$. Where $A_1$ and $A_2$ are relatively close, the modulation of the grating 410 written in the medium 308 can be quite weak.

It is possible to produce a phase shift 412 in the grating written in the medium 308, by abruptly adjusting the relative fluences in the two beams in any of cases I to III of FIG. 4A, as is illustrated in FIG. 4C. For example, the following method may be followed to induce a compact phase shift:

Make $A_1=0$ and leave $A_2=C$ at one position in the medium 308.

At an adjacent position in the medium make $A_2=0$ while leaving $A_1=C$.

By adjusting the fluence of the beams 302 and 304, the grating strength can be controlled, for example in order to conserve the mean index $n_{mean}$. Moreover, at $D \cdot \Delta\theta = \Lambda/2$, corresponding to a phase difference of 180° between the diffraction patterns 312 and 314, the phase shift 402 can be produced without turning off any of the beams, by writing weak gratings as described in relation to FIG. 4B and abruptly changing the relative amplitudes of the two beams. Hence, a 180° phase shift may be produced at any grating modulation strength while conserving the mean index $n_{mean}$. It should be noted that, in principle, there is a large number of ways to obtain a phase shift of 180°, or any other phase shift for that matter, since it is possible to add integral numbers of $2\pi$ to the phase difference between the two diffraction patterns 312 and 314, corresponding to increasing values of D. This may be important in practical applications, where it is difficult for the phase mask 307 to be placed close to the waveguide core.

The first and the second beams 302 and 304 may be generated and controlled individually. Typical control parameters include polarization; angle of incidence upon the medium or the diffractive element, for example a phase mask; transverse displacement, or scanning, in relation to the medium; beam profile; beam intensity; exposure parameters such as total exposure time, accumulated fluence, and, if a pulsed laser is used, pulse duration and repetition rate. Each parameter may be individually controlled using existing optical instruments and methods. In order to control the amplitude envelope function of a diffraction pattern from one beam, for example when scanning the beam, however, several parameters may be controlled simultaneously. Furthermore, in order to control the resulting index changes, the simultaneous control of parameters for the first and second beams 302 and 304 are preferably synchronized.

In another embodiment, the system used for exposing the material further comprises a light source that simultaneously produces and controls the first and second beams 302 and 304. In this embodiment, the first and second beams 302 and 304 may be generated from one linearly polarized beam, typically a UV laser beam generated by a laser. For example, the first and second beams may be generated from a single beam using a polarization beamsplitter (PBS).

Figure 5:
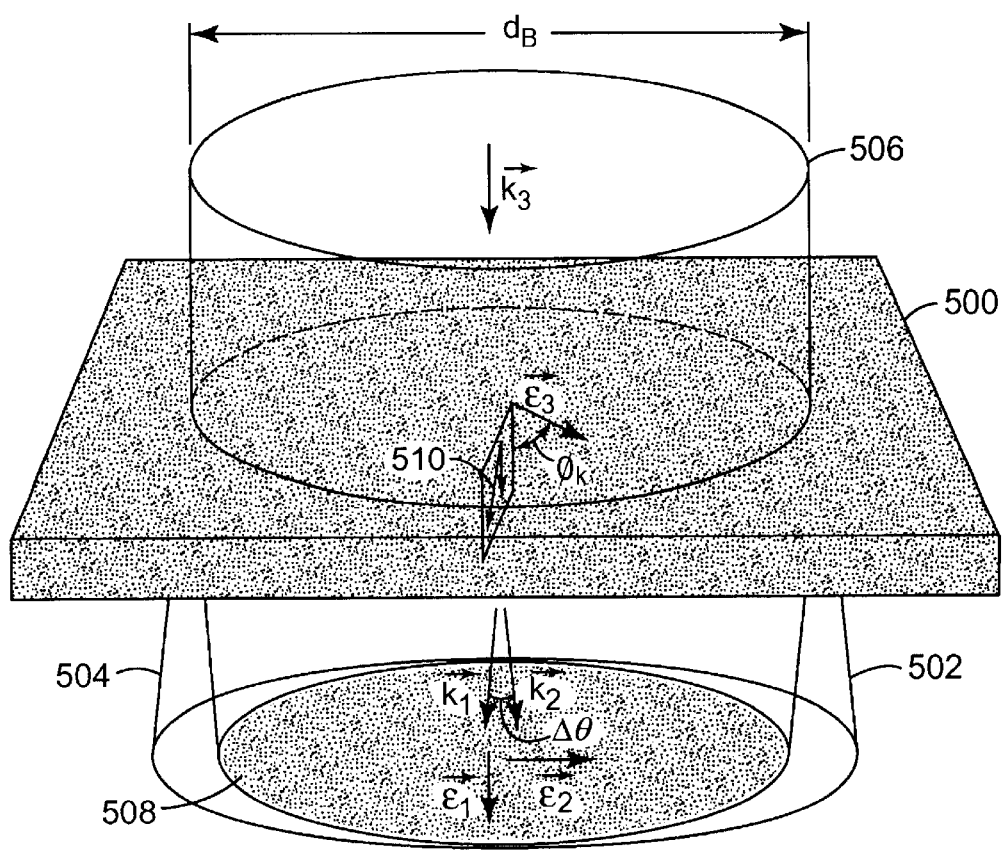
FIG. 5 schematically illustrates an embodiment of a system for writing gratings that uses a polarization beam-splitter according to the present invention.

In one particular embodiment of a PBS 500, illustrated in FIG. 5, the PBS is a specially cut birefringent crystal, such as a Wollaston or Rochon prism, which divides an incoming beam 506 into two mutually perpendicular polarized components 502 and 504. The two perpendicularly polarized output beams 502 and 504 emerge in directions having an angular separation $\Delta\theta$. The input beam 506, incident on the PBS 500, has a wavevector $k_3$, a beam diameter $d_B$ and a polarization state characterized by the polarization vector $\epsilon_3$. The polarization vector $\epsilon_3$ makes an angle $\phi_k$ to the plane formed between by the optic axis 510 of the PBS 500 and the wave vector $k_3$ of the input beam 506. The first and second emerging beams 502 and 504 are characterized by wavevectors $k_1$ and $k_2$ respectively and have polarization states characterized by mutually perpendicular polarization vectors $\epsilon_1$ (extraordinary ray) and $\epsilon_2$ (ordinary ray). Preferably the angular separation of the output beam is very small, such as $\Delta\theta \sim 0.5°$ so that there is a large area of overlap 508 close to the PBS 500.

The distribution of the fluence or power of the incoming beam into the first and second beams is determined by the angle $\phi_k$. At $\phi_k=0°$, the second, ordinary beam 504 is substantially extinguished and the power of the third beam 506 is coupled to the first beam 502. When the angle $\phi_k=45°$, the first and second beams 502 and 504 have substantially the same power. When the angle $\phi_k=90°$, the first extraordinary beam 502 is substantially extinguished and the power of the third beam 506 is coupled to the second beam 504. It is an important property of the PBS 500 that the sum of the fluences of the first and second beams 502 and 504 are substantially independent of $\phi_k$, and hence independent of the distribution of the fluence between the beams 502 and 504. Thus, it is possible to regulate the power in the first and second beams 502 and 504 by controlling the angle $\phi_k$, in other words by controlling the relative orientation of the polarization of the third beam 506 and the PBS 500.

Figure 6:
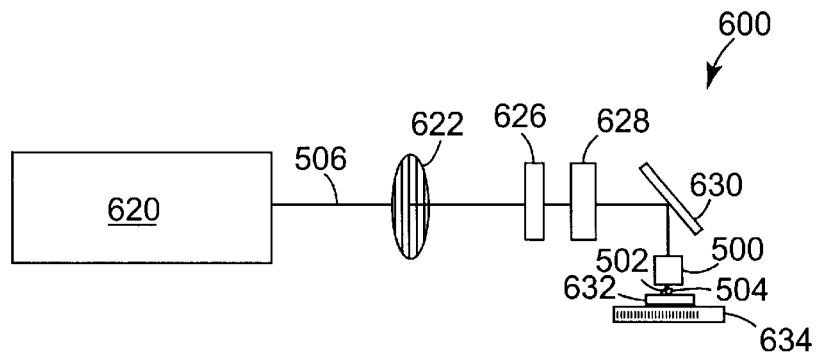
FIG. 6 schematically illustrates another embodiment of a system for writing gratings according to the present invention.

An embodiment of a system 600 that incorporates the PBS 500 of FIG. 5 is illustrated in FIG. 6. A laser 620 generates the third beam 506 of actinic radiation. The beam 506 may be polarized in the laser 620, but if the laser 620 emits unpolarized light, the beam 506 may be polarized using a polarizer 622. The polarizer 622 may be rotatable, for example it may be a Glan Taylor or Glan Thomson type. An advantage of a Glan-type polarizer 622 is its ability to sustain the high peak pulse power generated by a pulsed laser, such as an excimer laser. Half wave plates and prism rotators for high power applications may also be applied. The system 600 may also include beam shaping optics 626, beam deflecting optics 630. A low loss control element 628, such as a half wave plate, Faraday rotator, or prism based mechanical polarization rotators may be used to control the orientation of the polarization vector $\epsilon_3$.

The third beam 506 illuminates the PBS 500 to generate the first and second beams 502 and 504. The PBS 500 may also include a beamsplitter and beam steering optics to overlap the two orthogonally polarized beams 502 and 504. Typically, the PBS is positioned above the phase mask 632, so that the overlap region 508 of the first and second beam 502 and 504 covers part of the phase mask 632. If the angular separation, $\Delta\theta$, and the distance between the PBS 500 and the phase mask 632 are kept relatively small, then the first and second beams 502 and 504 are diffracted by the same region of the phase mask 632. Where the polarization dependence of the phase mask 632 is small each of the two beams 502 and 504 is split into respective first and second diffraction patterns 512 and 514.

Because of the angular separation of the two beams, the two diffraction patterns 512 and 514 gradually separate from each other as the distance D is increased. The distance between the two patters 512 and 514 them is $D \cdot \Delta\theta$. If the photosensitive medium 634, for example the core of an optical fiber or a planar optical waveguide, lies at the distance D from the phase mask 632, two gratings will be inscribed in the core 634 with a separation $D \cdot \Delta\theta$. As long as the thickness of the core 634 is small compared to D, it is possible to ignore the variation of the grating positions across the core.

Controlling the rotation of the polarization of the third beam 506, by using the control element 628, controls the relative fluences in the first and second diffraction patterns 512 and 514. Thus, the relative strength of the resulting diffraction patterns 512 and 514 is a function of the angle $\phi_k$, whereas the phase shift between the diffraction patterns 512 and 514 is a function of the distance D.

In order to demonstrate the versatility of the method and the UV exposure system, some examples are outlined by the three steps given below. The three steps assume that the distance D is adjusted to make $D \cdot \Delta\theta = \Lambda/2$ in order to make a phase shift between the diffusion patterns 512 and 514 of 180°. The settings are changeable during the same scan and hence different steps may be carried out in writing different parts of one grating:

Step 1. $\phi_k=0°$. Grating 1 is written with 100% strength.

Step 2. $\phi_k=45°$. No grating is written, but the same mean index shift is induced as for Steps 1 and 3, achieved simply by tuning the polarization of the third beam 506 incident on the PBS 500.

Step 3. $\phi_k=90°$: Grating 2 is written with 100% strength, with its phase shifted by 180° relative to the phase of Grating 1.

Steps 1–3 have been demonstrated experimentally in two experiments whose results are now described with reference to FIGS. 7A–7C, and FIGS. 8A–8B. In a system similar to that described with regard to FIG. 6, using a pulsed laser source, gratings were written into a fiber by the steps 1 to 3 outlined above.

Figure 7A:
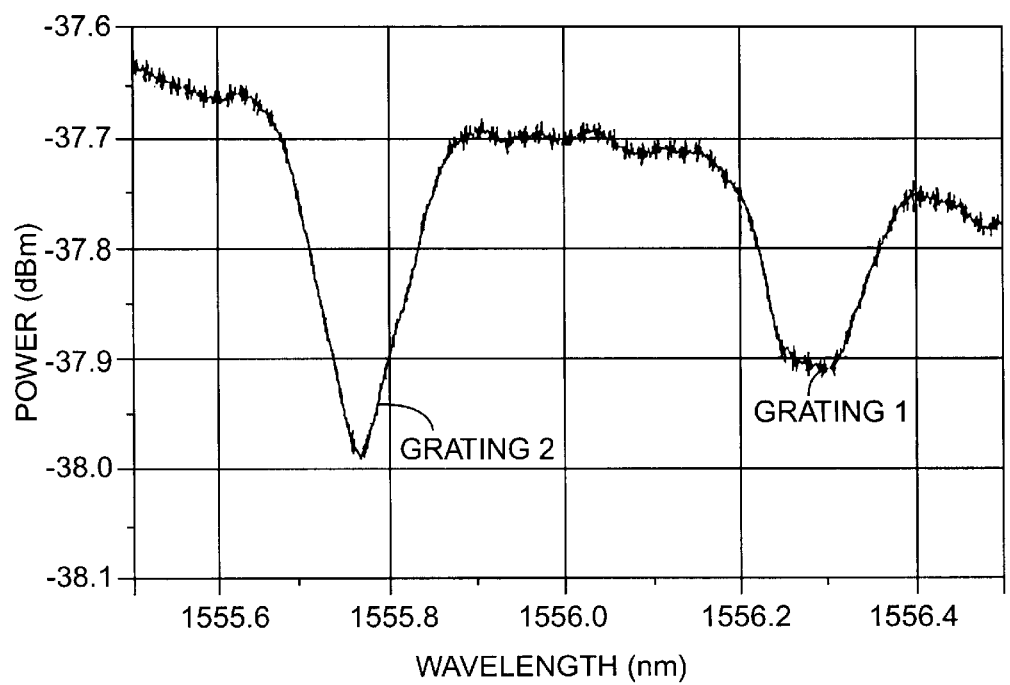
FIGS. 7A–7C present results of an experimental demonstration of the method for writing gratings into a medium according to the present invention.

First, a first grating was written into a fiber according to step 1 using 500 pulses with a beam fluence of approximately 77.8 mJ cm$^{-2}$. The first grating was stress tuned by stretching the fiber, thus altering the grating period and thereby separating the reflection wavelengths of the subsequently written refractive index gratings. A second grating was written according to step 3 using 500 pulses with a beam fluence of approximately 86.2 mJ/cm$^2$. The resulting transmission spectrum through the fiber is shown in FIG. 7A. The difference between the strength of the reflection peaks for grating 1 and grating 2 is at least partly due to the difference in beam fluence, caused by a slight drift in the laser power, when writing the gratings. The difference in reflection strength is also partly due to the polarization dependence of the photosensitivity and induced birefringence in the medium. The UV laser polarization in step 1 induces significantly more birefringence than in step 3, leading to gratings of different strengths when measured with an unpolarized source.

Figure 7B:
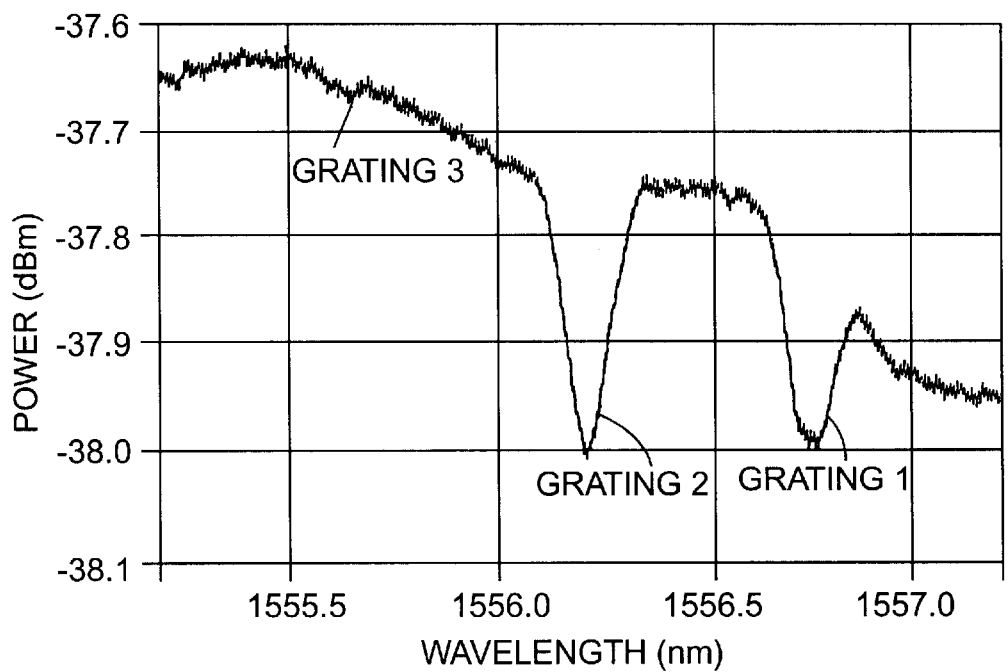
Figure 7C:
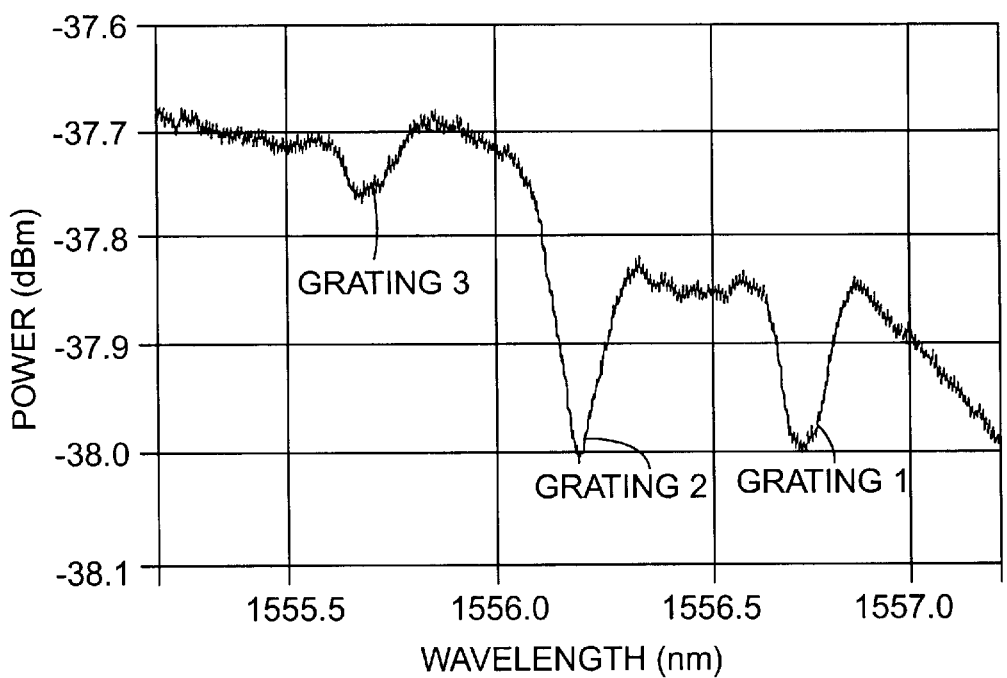

The first and second gratings were stress tuned again, and the polarization of the third beam 504 adjusted to make $\phi_k=45°$ according to step 2. The graph in FIG. 7B shows the transmission spectrum after 500 pulses of approximately the same fluence as used to produce the gratings whose reflectivity is shown in FIG. 7A. Only a small effect on the transmission spectrum, labelled as Graring 3, was produced. Another 4500 pulses were applied, giving a total of 5000 pulses in the configuration according to step 2, and the resulting spectrum is shown in FIG. 7C. Even though it was the result of ten times the fluence of the other peaks, having received 10 times the fluence of the other gratings, the small peak of Grating 3 in FIG. 7C resulting from illumination with $\phi_k=45°$ illustrates that the first and second diffraction patterns 512 and 514 canceled each other out almost perfectly. With slight adjustment of the set-up, the strength of the third grating may be reduced even further.

Figure 8A:
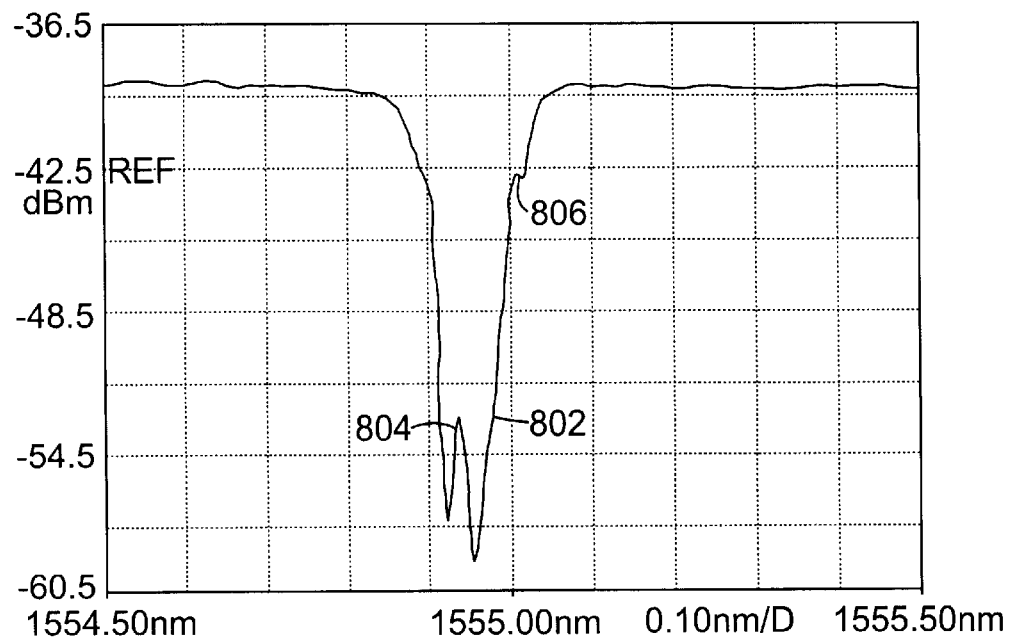
FIGS. 8A and 8B shows graphs representing experimental results of inducing a 180° phase shift in a grating structure according to an embodiment of the present invention.
Figure 8B:
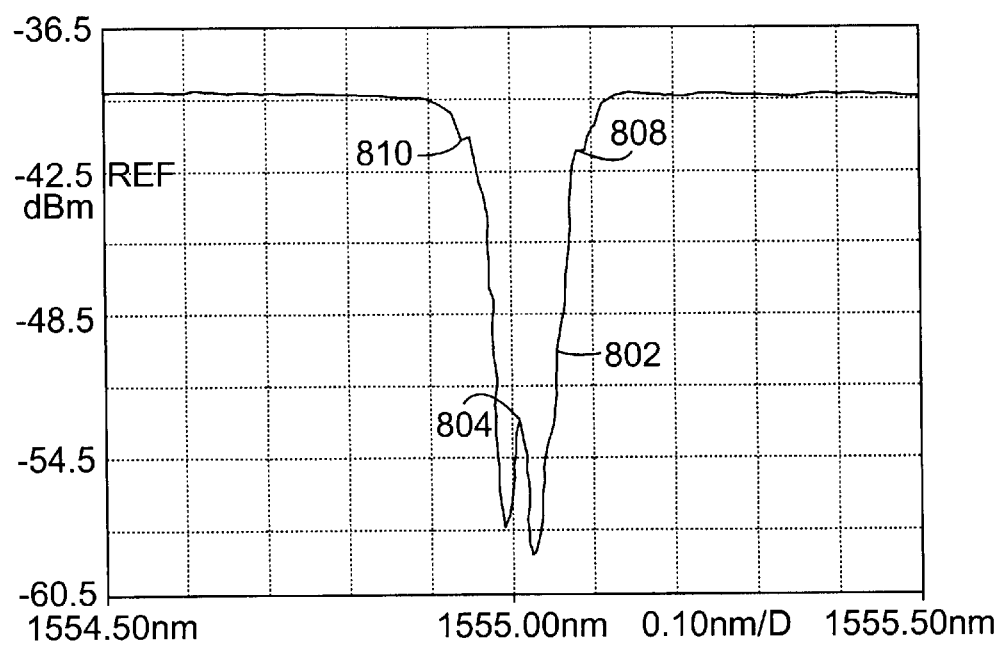

The results of inducing a 180° phase shift in a grating structure are illustrated in FIGS. 8A and 8B. The gratings are induced by subsequently applying steps 1 and 3 as described above. First a 20 mm long grating is written with $\phi_k=0°$, according to step 1, using a fluence of 1500 J cm$^{-2}$ at a wavelength of 248 nm generated by a KrF excimer laser. Then the polarization of the exposing light was shifted to $\phi_k=90°$, according to step 3 and the writing was continued for another 20 mm with the same fluence. This gave rise to a 180° phase change in the middle of the 40 mm long grating written in the fiber. The phase shift was distributed over a length corresponding to the beam diameter, around 1 mm. The grating written in the fiber was spectrally characterized by illuminating grating with amplified spontaneous emission (ASE) light from an erbium-doped fiber source and examining the spectrum of light transmitted through the grating using an optical spectrum analyzer a resolution of about 0.01 nm. The spectrum 802 of transmitted light is illustrated in FIG. 8A. Despite the high resolution of the analyzer, the dip 804 in reflectivity of the grating due to the phase shift may not be fully resolved spectrally. However, the dip 804 is very significant in strength and is situated close to the center of the grating's reflectivity peak. The fact that the dip 804 is not exactly in the middle of the grating's reflectivity spectrum may be due to a deviation in the distance between the phase mask and the core or instabilities in the laser power during the exposure of the fiber.

A weak post-exposure was performed after taking the measurements illustrated in FIG. 8A, with a total fluence of 15 J cm$^{-2}$ with $\phi_k=0°$, according to step 1. This reduced the UV-induced birefringence significantly and thus the reflectivity of the grating appears much more symmetric. For example, the single shoulder 806 in FIG. 8A is replaced by almost symmetrical shoulders 808 and 810 in FIG. 8B.

As is illustrated by these examples, continuous variation of $\phi_k$ between 0° and 90° makes it possible to perform a wide variety of different apodizations of grating 1, including sign reversal in other words a 180° phase-change. This is superior to the possibilities from most vibration-based UV exposure systems and is far superior to the performance of all other methods for controlling the UV writing of gratings in waveguides.

The intrinsic polarization dependence for the microscopic photosensitive processes of the index change is normally rather small, and it can often be ignored, as was the case with the experiments discussed above with regard to FIGS. 7A–7C and FIGS. 8A and 8B. If the intrinsic polarization sensitivity is too large to be ignored, but is still only a perturbation and not a dominant effect, it is normally possible to compensate for the polarization sensitivity by adding an offset to $\phi_k$. However, in many cases there is a complicated relationship between the UV-induced index change and the stress birefringence in the glass of the waveguide. The details of this relationship are not yet fully understood, but it may have some non-local and non-linear behavior. Several methods have been described to reduce these normally undesired effects. In cases with significant non-local behavior, compensation may not be possible by simply adding an offset to $\phi_k$.

It is possible that this kind of complicated behavior may sometimes have favorable practical applications. One such example is in the fabrication of special polarizing gratings, which are difficult, if not impossible, to realize in glass materials today. One such type of grating may reflect light in only one polarization state and pass light of the same wavelength in the orthogonal polarization state: such a device would be a combined polarization- and spectral-filter. A second type of grating is a polarization converting grating, for example a grating that reflects TE-polarization into TM-polarization and/or vice versa. Such types of gratings may be fabricated with $\phi_k$ close to 45° in a material with a significant non-local index-stress relationship. The simple argument is that there is no (mean) index modulation, only a modulation of the birefringence, which leads to a coupling between the TE and TM modes.

In many glasses (especially if the glasses are not photosensitized with hydrogen or deuterium) there is a significant non-linearity between the UV-intensity and the refractive index change. This non-linear effect is normally moderate for glasses loaded with hydrogen/deuterium gas. For a small or moderate non-linear behavior it is possible to use the same arguments presented above to find that an offset to 100

$\phi_k$ may be used as correction. If the non-linearity is significant, it may be necessary to add intensity control of the UV-source in order to correct the exposure.

The variation of the grating positions over the core due to the angle Δθ may lead to second-order corrections to the simple formula for addition of the grating intensities and may also lead to enhanced coupling to cladding modes. However, practical trials show that both effects are very small as long as the core diameter is much smaller than the distance D to the first 180° phase-change. Further, by choosing a large value of Δθ it may be possible to inscribe gratings that selectively couple to one cladding mode with very small reflection back into the core using the same principle as for the polarizing gratings.

Figure 9:
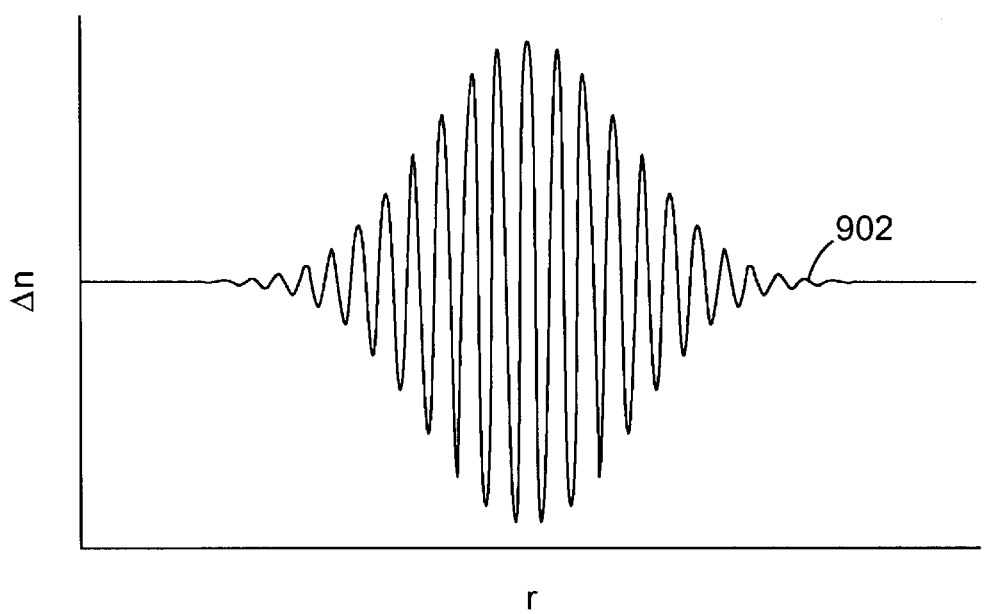
FIG. 9 is a graph showing a refractive index modulation having a constant mean refractive index, obtainable using the system and method of the present invention.

The exposure system and the methods described herein are particularly useful for fabrication of apodized and sampled gratings that are free of undesired chirp. By varying $\phi_k$, it is possible to induce any kind of apodisation or sampling curve only limited by a longitudinal resolution equal to the size of the laser beam. An example of a Gaussian apodized refractive index grating profile 902 without chirp is shown in FIG. 9. This kind of grating may be produced by starting the writing in one end with $\phi_k=45°$, corresponding to inducing the average index change with no modulation, and gradually scanning the UV laser beam towards the middle of the grating while changing $\phi_k$ to 0° in such a way that the rate of change of $\phi_k$ with distance scanned along the waveguide corresponds to inducing a Gaussian convolution curve for the modulation. The scanning is continued to the other end while reversing the changes in $\phi_k$ and returning to a value of $\phi_k=45°$ The average effective refractive index change induced remains unchanged along the grating, at least to first order, during the entire procedure because the average UV intensity is kept unchanged, when averaged over one period of the grating. Thus, it is possible to avoid (or at least significantly reduce) undesired chirp. In addition, it is possible to build 180° phase shifts into the apodisation or sampling function by also using the interval $45°<\phi_k<90°$. Other phase shifts than 180° may be realized by adjusting D·Δθ to obtain the desired value of the phase shift.

The exposure system and methods described herein provide tools for writing a variety of special grating structures by adjusting the basic parameters of the set-up or method, including Δθ, D, $\phi_k$, alignment of the phase mask and the photosensitive medium, the polarization of the third beam, the alignment of PBS and the phase mask. Some of these special grating structures are now described.

Figure 10:
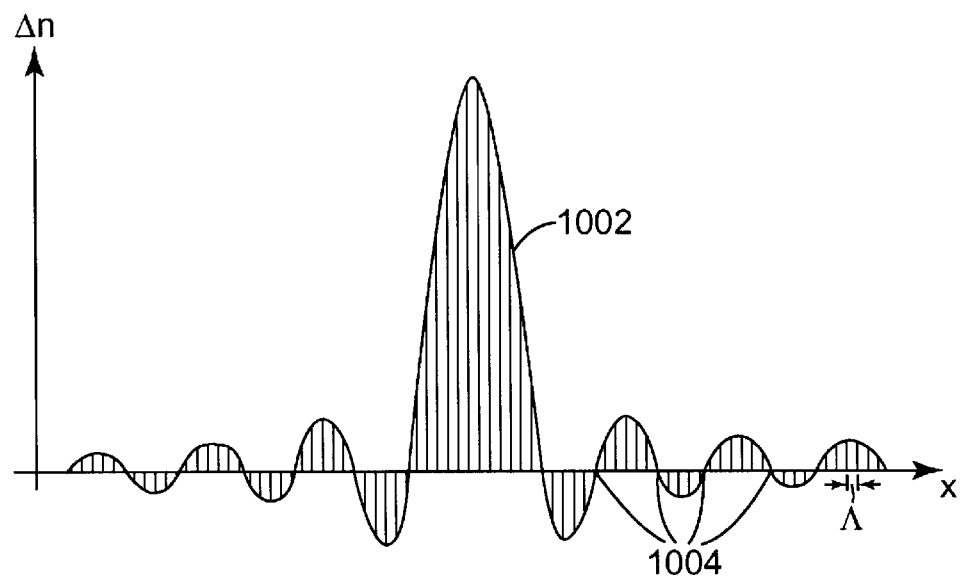
FIG. 10 is a graph showing a refractive index grating having a sinc envelope function, obtainable using the system and method of the present invention.

In some applications it may be desired to write refractive index gratings having complicated structures. One such grating is a grating 1002 having the shape of a sinc function (sinc(x)=sin(x)/x) as shown in FIG. 10, where the negative parts of the grating curve indicate that these parts of the grating are phase shifted by 180° compared to the positive parts of the grating curve. It will often be of interest to modulate the grating according to a sinc function since the sinc function is the Fourier transform of a rectangular function. Apodization of the grating with a sinc function provides a rectangular filter function, which is advantageous for many applications, for example DWDM, since it permits the smallest possible channel spacing. Conventional methods of producing a sinc function include varying the writing amplitude during scanning over a phase mask having period 2Λ. However, in order to write a correct sinc function, the repetitive phase shifts at the crossing points 1004 should be included. Hence, writing a correct sinc grating includes creating the sinc envelope function, $g_{env}(x)$, as described in expression (1), and also creating the phase shifts at the points 1002. The envelope function may be generated by varying $\phi_k$ within either of the intervals 0°–45° or 45°–90°, whereby the strength of the grating may be varied as described earlier with reference to FIGS. 4A–4C, while maintaining the same mean refractive index. At the crossing points 1004, the interval for $\phi_k$ is changed from 0°–45° to 45°–90° or vice versa. These changes are made smoothly since the crossover points 1002 are located at $\phi_k=45°$.

The photosensitivity of the medium may be anisotropic, in which case the magnitude of the refractive index changes induced using polarized electromagnetic radiation depend on the polarization of the incident light. When light propagates in the medium within the waveguide, the resulting refractive index of the medium seen by the light depends on the polarization of the light. The grating is birefringent. Preferably, the orientation of the optical axis in the medium with induced birefringence is controllable.

The control of the polarization and the phase of the diffraction patterns provided in the exposure system and the method of the present invention is advantageous when writing gratings in anisotropic media. Polarization-coupling gratings may be created by writing different parts of a grating using exposing light of different polarization. Such gratings may be designed to modulate the polarization of the light propagating along the waveguide.

In a first example, different sections of the grating along its longitudinal axis are written by different polarizations. This is easily obtained by adjusting $\phi_k$ while writing the grating. The varying birefringent properties along the longitudinal axis can modulate the light propagating within the waveguide.

Another approach depends on the transverse extent of the medium $d_m$, typically the thickness of the waveguide core, along the direction of the distance D from the phase mask. Since the first and second diffraction patterns are separated by D·Δθ, the superposition of the two diffraction patterns, and thereby the resulting fluence and polarization, varies as a function of the distance D. This variation becomes significant if the relative displacement $d_m·Δθ$ of the diffraction patterns over the transverse extent of the medium is not negligible compared to the periods of the diffraction patterns.

Figure 11:
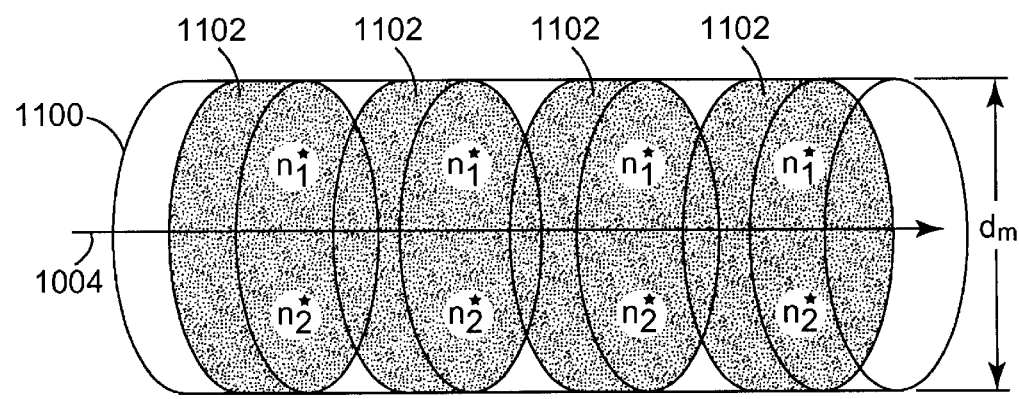
FIG. 11 shows a perspective view of a waveguide having a polarization coupling grating manufactured using an embodiment of the present invention.

As illustrated in FIG. 11, the refractive index of a waveguide core 1100 is changed in a cross section 1102 using the method described above. Due to the relative displacement $d_m·Δθ$ of the diffraction patterns, the resulting fluence and polarization of the exposing electromagnetic radiation differs in the upper part of the medium from the lower part of the core 1100. Consequently, the upper and lower parts of the core 1100 have different refractive indices $n_1*$ and $n_2*$, where the "*" refers to the birefringent properties of the induced index changes.

If the optical axis of the birefringent regions of the cross section 1102 is oriented substantially nonparallel with the direction of propagation of light 1104 within the waveguide core 1100, the birefringent regions 1102 have the effect of rotating the polarization of the light 1104. Since $n_1*$ and $n_2*$ are different, the cross section 1102 rotates the polarization of different parts of the wavefront of the light 1104 differently, thus generating a polarization gradient across the wavefront.

A further advantageous application of the exposure system and the exposing method described above is in the writing of gratings comprising sub- and super-harmonic components of the diffraction patterns. Many phase masks, for writing a first order grating for reflecting light at a center wavelength of $\lambda_0$, may be used to write higher order gratings with reflections at wavelength near $\lambda_0/N$ or $2\lambda_0/N$ (N=2, 3, 4, . . . ). For $\phi_k=45°$, the first order diffraction may be effectively eliminated, while leaving some of the higher order diffraction peaks. By further adjusting the phase shift $D\cdot\Delta\theta$, the grating resulting from sub- and super-harmonic components of the diffraction patterns can be controlled.

Also, the exposure system and exposure method may be used for writing long-periodic gratings, typically having periods of the order of a few times 100 μm. Instead of applying an amplitude mask for forming the grating amplitude envelope, the long period variations of the refractive index may be written by continuously varying $\phi_k$ during scanning. Thereby the mean index $n_{mean}$ along the length of the grating may be kept constant, a characteristic that is difficult to achieve using amplitude masks.

The exposure system and exposure method described above provide a unique way of controlling such exposing parameters as the fluence, the angle of incidence and the polarization of the exposing beams without putting any uncommon restrictions onto the rest of the arrangement and the writing procedures compared to traditional set-ups and methods. Thus, the exposure system and exposure method of the present invention may be utilized to write any standard type of grating, for example mode selective gratings or slanted gratings.

Figure 12:
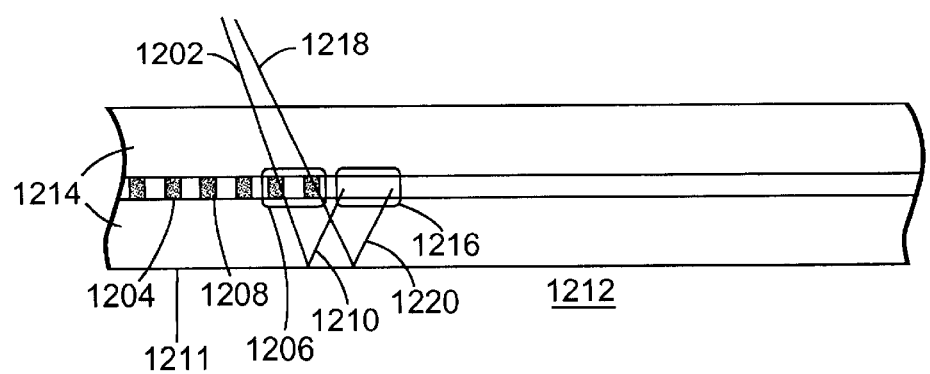
FIG. 12 illustrates a schematic cross-sectional view of writing a grating structure in a waveguide and internal reflection of the writing radiation in the waveguide cladding according to the present invention.

A problem often encountered when using standard writing techniques is that further index changes are induced in the waveguide core due to reflections from other parts of the media, such as the cladding layers. This is illustrated in FIG. 12, where a diffracted beam 1202 writes a grating 1204 in a limited area 1206 of the core 1208. However, part 1210 of the diffracted beam 1202 is reflected at the cladding interface 1211 if the material 1212 abutting the outside of the cladding layer 1214 has a different refractive index, as is often the case for optical fibers in air or planar waveguides on silica or silicon substrates. The reflected light 1210 induces a refractive index change in an adjacent area 1216 of the core 1208. This effect may deteriorate the grating 1204 by inducing a second, usually weaker, phase shifted and possibly aberrated grating structure in the core 1208.

According to the exposure system and exposure method described above, the grating 1204 will be written in the area 1206 of the core 1208 by a superposition of the diffraction patterns corresponding to beams 1202 and 1218. By adjusting the thickness of the lower cladding layer 1214 and/or the angle of incidence of the beams 1202 and 1218 upon the cladding interface 1211, a 180° phase shift between the diffraction patterns corresponding to beams 1202 and 1218 may be obtained in the area 1216. According to case 11 described with reference to FIG. 4A, this will induce a smooth index shift which will not deteriorate the grating 1208, although small irregularities may appear due to aberrations in the reflected light 1210 and 1220.

Finally, it should be mentioned that the distance $D_s$ between the PBS and the waveguide core is preferably kept small. The reason is that the two beams separate spatially by $D_s\cdot\Delta\theta$, and it is often desirable to have as large an overlap between the two beams as possible. Fortunately, the condition for this effect to be ignored, $D_s\cdot\Delta\theta<<d_B$, where $d_B$ is the diameter of the beam incident on the PBS, is usually straightforward to fulfill. One important exception may be when writing gratings with very fine structure using a focused laser beam. When used together with the reflection cancellation method described with reference to FIG. 12, this may be turned into an advantage in the case of waveguides in several layers, where the proper choice of D may allow selective writing of index modulations in some of the waveguides.

As noted above, the present invention is applicable to creating refractive index changes in photosensitive materials, and is believed to be particularly useful in forming Bragg gratings, or other types of gratings, in waveguides. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification.

We claim:

1. A method for changing a refractive index of a first part of a medium, comprising:

providing first and second beams of electromagnetic radiation, the first beam having a first polarization state and a first wavevector, the second beam having a second polarization state different from the first polarization state, and a second wavevector different from the first wavevector;

illuminating a diffractive optical element by at least a part of the first beam and a part of the second beam so as to diffract parts of the first and second beams; and positioning the medium in relation to the diffractive element so as to illuminate the first part of the medium by the diffracted parts of the first and second beams.

2. A method according to claim 1, wherein the first and the second beam have substantially the same frequencies, and wherein the first and second wavevectors are non-parallel.

3. A method according to claim 1, wherein the first polarization state and the second polarization state are mutually orthogonal.

4. A method according to claim 1, wherein the first polarization state and the second polarization state are at least substantially linear polarization states.

5. A method according to claim 1, further comprising adjusting relative intensities of the first and second beams.

6. A method according to claim 1, further comprising adjusting a spatial overlap of the diffracted parts of the first and second beams at the position of the first part of the medium by adjusting a distance between the medium and the diffractive optical element.

7. A method according to claim 1, further comprising changing the refractive index of the medium in response to the intensity distribution of at least one of a first and a second diffraction pattern formed respectively by the diffracted parts of the first and second beam.

8. A method according to claim 7, further comprising adjusting relative intensities of the first and second diffraction patterns by adjusting relative intensities of the first and of the second beams, and inducing a refractive index grating in the medium corresponding to the first diffraction pattern, the first refractive index grating having a first period $\Lambda_1$ and a first amplitude envelope function $g_{env,\,1}$, wherein the relative intensities of the first and second diffraction patterns are adjusted so that the second diffraction pattern does not induce any substantial change in the refractive index of the medium.

9. A method according to claim 1, further comprising inducing first and second refractive index gratings in the medium corresponding respectively to the first and the second diffraction patterns, the first refractive index grating having a first period $\Lambda_1$ and a first amplitude envelope function $g_{env,\,1}$, the second refractive index grating having a second period $\Lambda_2$ and a second amplitude envelope function $g_{env,\,2}$.

10. A method according to claim 9, further comprising adjusting a phase relation between the first and second refractive index gratings by adjusting a distance between the medium and the diffractive optical element.

11. A method according to claim 9, further comprising adjusting a phase relation between the first and second refractive index gratings by adjusting an angle between the first and second beams.

12. A method according to claim 9, further comprising adjusting the first amplitude envelope function $g_{env,\,1}$ relative to the second amplitude envelope function $g_{env,\,2}$ so as to obtain a substantially constant mean refractive index in the first part of the medium.

13. A method according to claim 9, further comprising inducing a first and a second refractive index grating in the first part of the medium, said first and a second refractive index grating having a first phase relation in a region of the first part lying at a first distance from the diffractive optical element and a second phase relation in a region of the first part lying at a second distance, different form the first distance, from the diffractive optical element.

14. A method according to any of claims 9 to 12, wherein the amplitude envelope functions are adjusted by adjusting the intensity of the first beam in relation to the intensity of the second beam.

15. A method according to claim 1, wherein the diffractive optical element includes a phase mask.

16. A method according to claim 1, further comprising generating the first and second beams of electromagnetic radiation from a third beam of electromagnetic radiation having a third polarization state and a third wavevector.

17. A method according to claim 16, wherein generating the first and second beams includes dividing at least part of the third beam into the first and second beams with respective first and second wavevectors.

18. A method according to claim 16, wherein generating the first and second beams further comprises dividing the third beam into first and second beams, the first and second beams being polarized substantially mutually orthogonally, using a beamsplitter having a first optical axis.

19. A method according to claim 18, wherein the polarization beamsplitter is one of a Wollaston and a Rochon prism.

20. A method according to claim 18, further comprising controlling an angle of incidence of the first and second beams onto the diffractive optical element by use of the polarization beamsplitter.

21. A method according to claim 18, further comprising adjusting an angle between the third polarization vector of the third beam and a plane containing the optical axis of the polarization beamsplitter and the third wavevector.

22. A method according to claim 21, further comprising adjusting first and second amplitude envelope functions of diffraction gratings, formed by the first and second beams respectively, by adjusting the angle between the third polarization vector of the third beam and the plane containing the optical axis of the polarization beamsplitter and the third wavevector.

23. A method according to claim 1, further comprising changing the refractive index of a second part of the medium by translating the diffracted parts of the first and second beams relative to the medium.

24. A method according to claim 23, wherein translating the diffracted parts includes scanning the diffracted parts of the first and the second beams beam relative to the medium.

25. A method according to claim 24, further comprising varying properties of the induced refractive index change while scanning, the properties being varied by varying one or more of the parameters selected from i) a distance between the diffractive element and the part of medium wherein the refractive index is changed, ii) angle of incidence of at least one of first and second beams upon the diffractive element, iii) relative intensity of the first and second beams, and iv) angle between a third polarization vector of a third beam used to generate the first and second beams using a polarization beamsplitter and the plane containing an optical axis of the polarization beamsplitter and the wavevector of the third beam.

26. A system for changing a refractive index of at least part of a medium, comprising:

means for generating first and second beams of electromagnetic radiation having first and second wavevectors respectively, the first beam being polarized substantially orthogonally to the second beam; and diffracting means for generating a first set of diffracted beams with a first polarization state when illuminated by the first beam and for generating a second set of diffracted beams with a second polarization state when illuminated by the second beam;

wherein at least the part of the medium is positioned so as to be illuminated by at least part of one of the first and second sets of diffracted beams.

27. A system for changing refractive index of at least part of a medium, comprising:

a light generating unit producing a first polarized light beam having a first wavevector and a second polarized light beam having a second wavevector different form the first wavevector, the first beam being polarized substantially orthogonally to the second beam; and a diffractive optical element disposed in the first and second beams to generate a first set of diffracted beams from the first beam and a second set of diffracted beams from the second beam, the at least the part of the medium being positioned so as to be illuminated by at least part of one of the first and second sets of diffracted beams.

28. A system according to claim 27, wherein the light generating unit includes a light source providing a third light beam and a splitter for splitting the third light beam into the first and second light beams.

29. A system according to claim 28, wherein the splitter is a polarizing beam splitter having an optical axis.

30. A system according to claim 29, wherein the polarizing beamsplitter is a one of a Wollaston prism and a Rochon prism.

31. A system according to claim 29, wherein the optical axis and a polarization vector of the third beam are adjustable relative to one another, so that relative intensities of the first and second beams are adjustable by adjusting at least one of the optical axis of the polarizing beamsplitter and the polarization vector of the third beam.

32. A system according to claim 31, wherein the light source provides the third light beam as a polarized light beam and further comprising a polarization rotator disposed in the third beam to adjust the polarization vector of the third beam.

33. A system according to claim 31, wherein the light source provides the light source as an unpolarized light beam, and further comprising a polarizer disposed on a path of the third light beam to polarize the third light beam.

34. A system according to claim 33, wherein the polarizer is rotatable so as to rotate a polarization vector of the third beam.

35. A system according to claim 27, wherein the two sets of diffracted beams overlap at the medium.

36. A system according to claim 27, wherein at least one of a) the medium and b) the first and second sets of diffracted beams is translatable so as to illuminate different parts of the medium with at least one of the first and second sets of diffracted beams.

37. A system according to claim 27, wherein the diffractive optical element is a phase mask.

38. A system according to claim 27, wherein a distance between the diffractive optical element and the part of the medium is adjustable.

39. A system according to claim 27, wherein first and second light beams have a wavelength in the range 150 nm to 450 nm.

40. A method of changing the refractive index of a medium, comprising:

illuminating a first part of the medium with a first set of diffracted light beams produced by a diffractive optical element so as to induce a first refractive index grating in the medium;

illuminating a second part of the medium with a second set of diffracted light beams produced by the diffractive optical element so as to induce a second refractive index grating in a second part of the medium; and controlling a phase difference between the first and second refractive index gratings by adjusting a working distance between the medium and diffracting optical element; wherein the first set of diffracted beams is produced from a first polarized light beam having a first wavevector and the second set of diffracted light beams is produced from a second polarized light beam having a second wavevector different from the first wavevector, the second light beam being polarized substantially orthogonally to the first light beam.

41. A method according to claim 40, further comprising adjusting relative intensities of the first and second sets of diffracted beams.

42. A method according to claim 41, further comprising maintaining a substantially constant fluence of light over a treated area of the medium so as to maintain an average refractive index that is substantially flat over the treated area.

43. A method according to claim 40, further comprising translating one of a) the medium and b) the first and second sets of diffracted beams and illuminating third and fourth parts of the medium with the first and second sets of diffracted beams respectively.

* * * * *

UNITED STATES PATENT AND TRADEMARK OFFICE
CERTIFICATE OF CORRECTION

PATENT NO. : 6,747,798 B2
APPLICATION NO. : 09/861907
DATED : June 8, 2004
INVENTOR(S) : Kristensen It is certified that error appears in the above-identified patent and that said Letters Patent is hereby corrected as shown below:

At Claim 24, Column 17, Line 65, please replace "beams beam" with --beams--

At Claim 27, Column 18, Line 31, please replace "form" with --from--

At Claim 30, Column 18, Line 48, please remove the first occurrence of "a"

Signed and Sealed this

Fourth Day of December, 2007

JON W. DUDAS
*Director of the United States Patent and Trademark Office*